(12) United States Patent
Germain

(10) Patent No.: US 7,748,720 B2
(45) Date of Patent: Jul. 6, 2010

(54) VEHICLE ROLL CONTROL SYSTEM

(76) Inventor: Philippe Germain, 96 rue Gambetta, Fontenay-sous-Bois (FR) 94120

( * ) Notice: Subject to any disclaimer, the term of this patent is extended or adjusted under 35 U.S.C. 154(b) by 212 days.

(21) Appl. No.: 12/217,801

(22) Filed: Jul. 9, 2008

(65) Prior Publication Data

US 2009/0020964 A1 Jan. 22, 2009

(30) Foreign Application Priority Data

Jul. 19, 2007 (GB) .................................. 0714103.9

(51) Int. Cl.
*B60G 21/045* (2006.01)
(52) U.S. Cl. .......... 280/5.506; 280/5.511; 280/124.106; 280/124.149; 280/124.152; 280/124.157
(58) Field of Classification Search ............... 280/5.502, 280/5.506, 5.511, 124.106, 124.149, 124.152, 280/124.157, 124.159
See application file for complete search history.

(56) References Cited

U.S. PATENT DOCUMENTS 4,613,153 A * 9/1986 Shibahata et al. ......... 280/5.511

(Continued)

FOREIGN PATENT DOCUMENTS

EP 0783986 7/1997

(Continued)

*Primary Examiner*—Toan C To
(74) *Attorney, Agent, or Firm*—Dickinson Wright PLLC; William H. Honaker

(57) ABSTRACT

A roll control system comprising a front torsion bar; a front first hydraulic actuator; a front second hydraulic actuator; a rear torsion bar; a rear first hydraulic actuator; a rear second hydraulic actuator; and control means connected to the hydraulic actuators and controlling the operation thereof on detection of a predetermined vehicle condition; wherein each hydraulic actuator comprises a first fluid chamber and a second fluid chamber; wherein the control means comprises a source of fluid pressure, a fluid reservoir, a pressure control valve fluidly connected between the pressure source and the reservoir, and at least three pressure relief valves each having two positions to fluidly connect the fluid chambers of the hydraulic actuators either to the pressure source or to the fluid reservoir; wherein the pressure relief valves are positioned on detection of the predetermined vehicle condition to apply a fluid pressure to the first fluid chamber of the first front hydraulic actuator and to the second fluid chamber of the second front hydraulic actuator, and/or to apply a fluid pressure to the second fluid chamber of the first front hydraulic actuator and to the first fluid chamber of the second front hydraulic actuator, and/or to apply a fluid pressure to the first fluid chamber of the first rear hydraulic actuator and to the second fluid chamber of the second rear hydraulic actuator, and/or to apply a fluid pressure to the second fluid chamber of the first rear hydraulic actuator and to the first fluid chamber of the second rear hydraulic actuator.

10 Claims, 4 Drawing Sheets

U.S. PATENT DOCUMENTS

| | | | |
|---|---|---|---|
| 4,801,155 A * | 1/1989 | Fukushima et al. | 280/5.508 |
| 5,161,822 A * | 11/1992 | Lund | 280/124.106 |
| 5,362,094 A * | 11/1994 | Jensen | 280/124.107 |
| 5,480,186 A * | 1/1996 | Smith | 280/5.511 |
| 5,630,623 A * | 5/1997 | Ganzel | 280/124.106 |
| 7,055,832 B2 * | 6/2006 | Germain | 280/5.508 |
| 7,234,707 B2 * | 6/2007 | Green et al. | 280/5.511 |
| 7,293,780 B2 * | 11/2007 | Germain et al. | 280/5.506 |
| 7,501,786 B2 * | 3/2009 | Yasui et al. | 318/799 |
| 7,600,770 B2 * | 10/2009 | Walentowski | 280/124.13 |

FOREIGN PATENT DOCUMENTS

| | | |
|---|---|---|
| EP | 1103395 | 5/2001 |
| WO | 02/083439 | 10/2002 |
| WO | 03/093041 | 11/2003 |
| WO | 2005/108128 | 11/2005 |

* cited by examiner

VEHICLE ROLL CONTROL SYSTEM

TECHNICAL FIELD

The present invention relates to a roll control system for a motor vehicle.

BACKGROUND OF THE INVENTION

EP-A-0783986 describes a roll control system in which hydraulic actuators are powered to provide active roll control for the vehicle. The actuators generate torsion in the vehicle's torsion bars. WO-A-02/83439 describes an active roll control system having two hydraulic actuators attached to each torsion bar. EP-A-1103395 discloses a vehicle roll control system in which a pair of directional valves and a pressure control valve are used to control the movement of the piston of hydraulic actuators associated with the front and rear axles of a motor vehicle. WO-A-03/093041 discloses a vehicle roll control system in which a pair of pressure control valves and a directional valve are used to control the movement of the piston of hydraulic actuators associated with the front and rear axles of a motor vehicle. In both cases, each hydraulic actuator has a first fluid chamber positioned on one side of the piston, and a second fluid chamber positioned on the other side of the piston. The first fluid chambers of the front and rear hydraulic actuators receive hydraulic fluid at substantially the same pressure; and the second fluid chambers of the front and rear hydraulic actuators receive hydraulic fluid at substantially the same pressure. WO-A-2005/108128 discloses a roll control system in which the control means for the hydraulic circuit is capable of providing fluid pressure to the first fluid chamber of the front hydraulic actuator which is different from the fluid pressure provided to the first fluid chamber of the rear hydraulic actuator; and/or is capable of providing fluid pressure to the second fluid chamber of the front hydraulic actuator which is different from the fluid pressure provided to second fluid chamber of the rear hydraulic actuator.

SUMMARY OF THE INVENTION

The aim of the present invention is to provide a roll control system which is an improvement to known arrangements.

A roll control system in accordance with the present invention is defined by the features specified in Claim 1.

The present invention provides a system which allows an aggressive roll control strategy and balance strategy which leads to improvements in motion, turning, and stability (braking in turn at high speed). The present invention also provides continuous control between right turn and left turn, and is a two channel system which allows adaptive front/rear handling balance with load, speed and other factors, improving vehicle stability and control.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
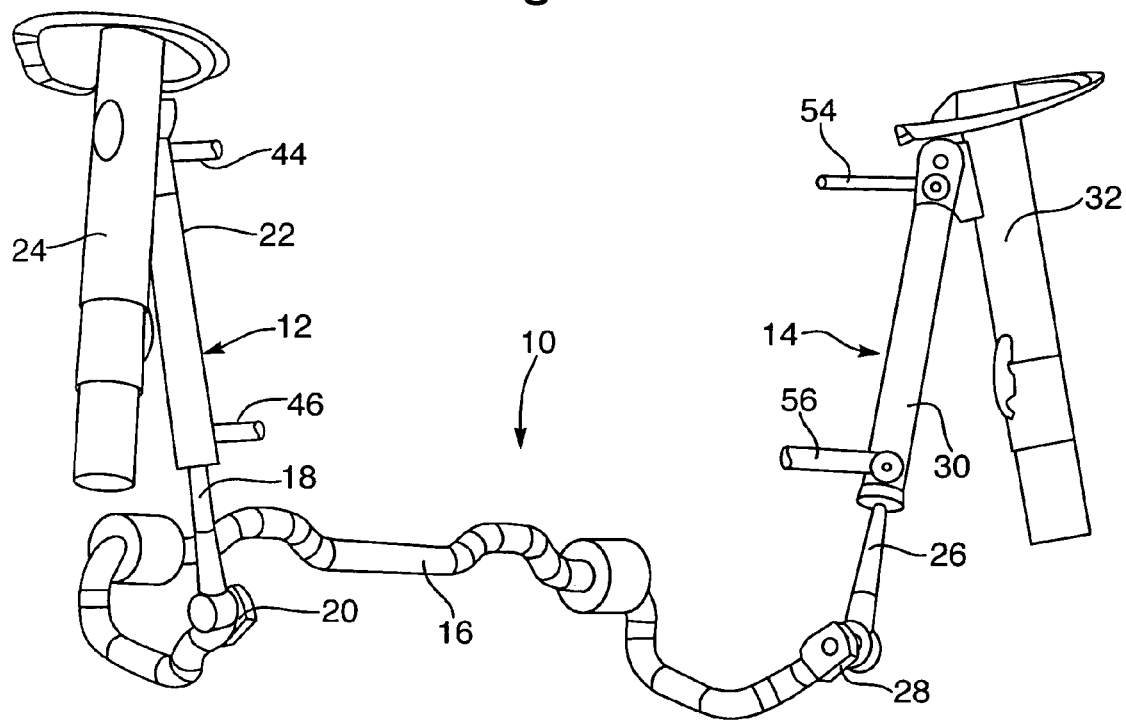
FIG. 1 is a view of the hydraulic actuators and torsion bar of a roll control system in accordance with the present invention for one axle of a motor vehicle.

FIG. 1 shows a portion of a roll control system 10 in accordance with the present invention for one axle of a motor vehicle. The roll control system 10 includes a first hydraulic actuator 12, a second hydraulic actuator 14, and a torsion bar 16. The first actuator 12 has a piston rod 18 which is fixed to one end 20 of the torsion bar 16; and a housing 22 which is connected to one of the shock absorbers 24 associated with the vehicle axle. The second actuator 14 has a piston rod 26 which is fixed to the other end 28 of the torsion bar 16; and a housing 30 which is connected to the other shock absorber 32 associated with the vehicle axle. The first and second actuators 12, 14 are substantially identical, and further details are given below.

Figure 2:
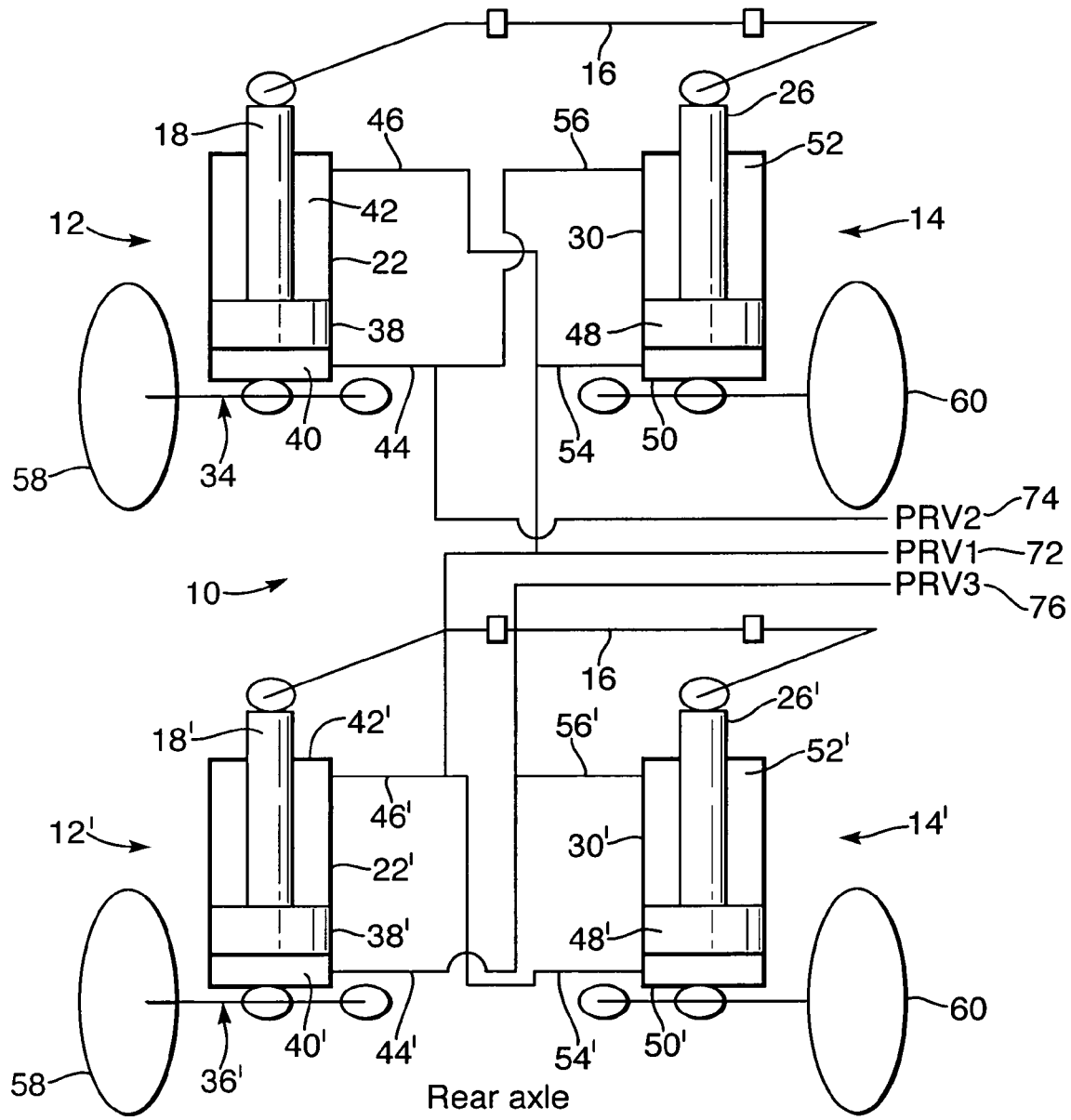
FIG. 2 is a schematic view of a roll control system in accordance with the present invention, with the hydraulic system and electrical control system omitted for clarity.

In FIG. 2, further details of the roll control system 10 of FIG. 1 are shown in connection with the front axle 34 and the rear axle 36 of the vehicle. The first and second actuators 12, 14 and the torsion bar 16 for the front axle 34 are substantially identical, and substantially identical to the first and second actuators 12', 14' for the rear axle 36. Each first actuator 12, 12' comprises the housing 22, 22'; a piston 38, 38' sealably slidably mounted inside the housing; a compression chamber 40, 40' and a rebound chamber 42, 42' defined by the piston inside the housing; the piston rod 18, 18' connected to the piston, extending through the rebound chamber, and out of the housing; a fluid line 44, 44' connected to the compression chamber; and a fluid line 46, 46' connected to the rebound chamber. Each second actuator 14, 14' comprises the housing 30, 30'; a piston 48, 48' sealably slidably mounted inside the housing; a compression chamber 50, 50' and a rebound chamber 52, 52' defined by the piston inside the housing; the piston rod 26, 26' connected to the piston, extending through the rebound chamber, and out of the housing; a fluid line 54, 54' connected to the compression chamber; and a fluid line 56, 56' connected to the rebound chamber.

Figure 3:
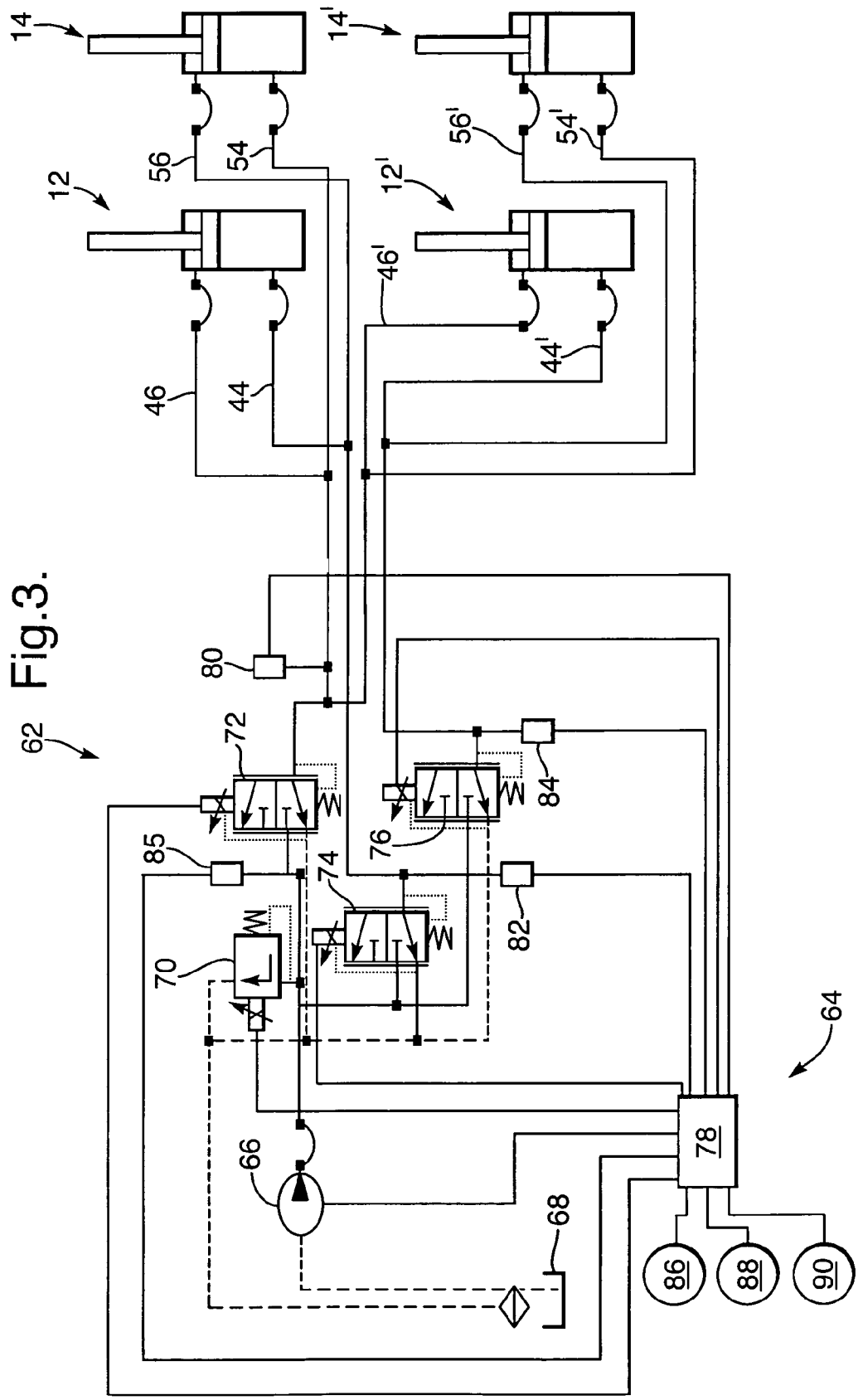
FIG. 3 is a schematic view of a roll control system in accordance with the present invention showing a first embodiment of the hydraulic system.

FIG. 3 shows a first embodiment of the hydraulic system 62 and electrical control system 64 for the roll control system 10 of FIGS. 1 and 2. The hydraulic system includes a fluid pump 66, a tank or reservoir 68, a pressure control valve 70, a first pressure relief valve 72, a second pressure relief valve 74, and a third pressure relief valve 76. The electrical control system 64 includes a control module 78 which is electrically connected to the pump 66, the pressure control valve 70, and the pressure relief valves 72, 74, 76, to control the operation thereof. The module 78 is also connected to pressure sensors 80, 82, 84 associated with each pressure relief valve 72, 74, 76, and with a pressure sensor 85 which monitors the applied fluid pressure from the fluid pump 66 as control by the pressure control valve 70. The module 78 is also connected to other vehicle sensors such as a lateral g sensor 86 (which monitors the sideways acceleration of the vehicle), a steering sensor 88 (which monitors the steering angle of the front wheels), a vehicle speed sensor 90, and/or any other relevant parameter. From the signals from the various sensors, the control module 78 determines if roll control is required and actuates the pressure control valve 70 and the pressure relief valves 72, 74, 76 as appropriate.

In this first embodiment, each pressure relief valve 72, 74, 76 is solenoid actuated and has two positions. When the pressure relief valves 72, 74, 76 are in their first or rest position, as shown in FIG. 3, all the compression chambers 40, 40', 50, 50' and all the rebound chambers 42, 42', 52, 52' are connected to the tank 68. When the first pressure relief valve 72 is actuated to its second position, the rebound chambers 42, 42' of the first actuators 12, 12' and the compression chambers 50, 50' of the second actuators 14, 14' are fluidly disconnected from the tank 68 and fluidly connected to the pump 66 in order to receive pressurised fluid. When the second pressure relief valve 74 is actuated to its second position, the compression chamber 44 of the front first actuator 12 and the rebound chamber 52 of the front second actuator 14 are fluidly disconnected from the tank 68 and fluidly connected to the pump 66 in order to receive pressurised fluid. When the third pressure relief valve 76 is actuated to its second position, the compression chamber 44' of the rear first actuator 12' and the rebound chamber 52' of the rear second actuator 14' are fluidly disconnected from the tank 68 and fluidly connected to the pump 66 in order to receive pressurised fluid. The pressure of the fluid, as generated by the pump 66, is controlled by the pressure control valve 70. Actuation of the pressure relief valves 72-76 creates a pressure differential between the compression chamber 40, 40', 50, 50' and the rebound chamber 42, 42', 52, 52' of one or more of the actuators 12, 12', 14, 14' to cause the actuator or actuators to extend or compress (dependent on which pressure relief valves are actuated and the controlled pressure from the pump 66), thereby having an effect on the roll or pitch of the vehicle. The pressure relief valves 72-76 may be actuated individually, or two or more pressure relief valves may be actuated substantially simultaneously.

Figure 4:
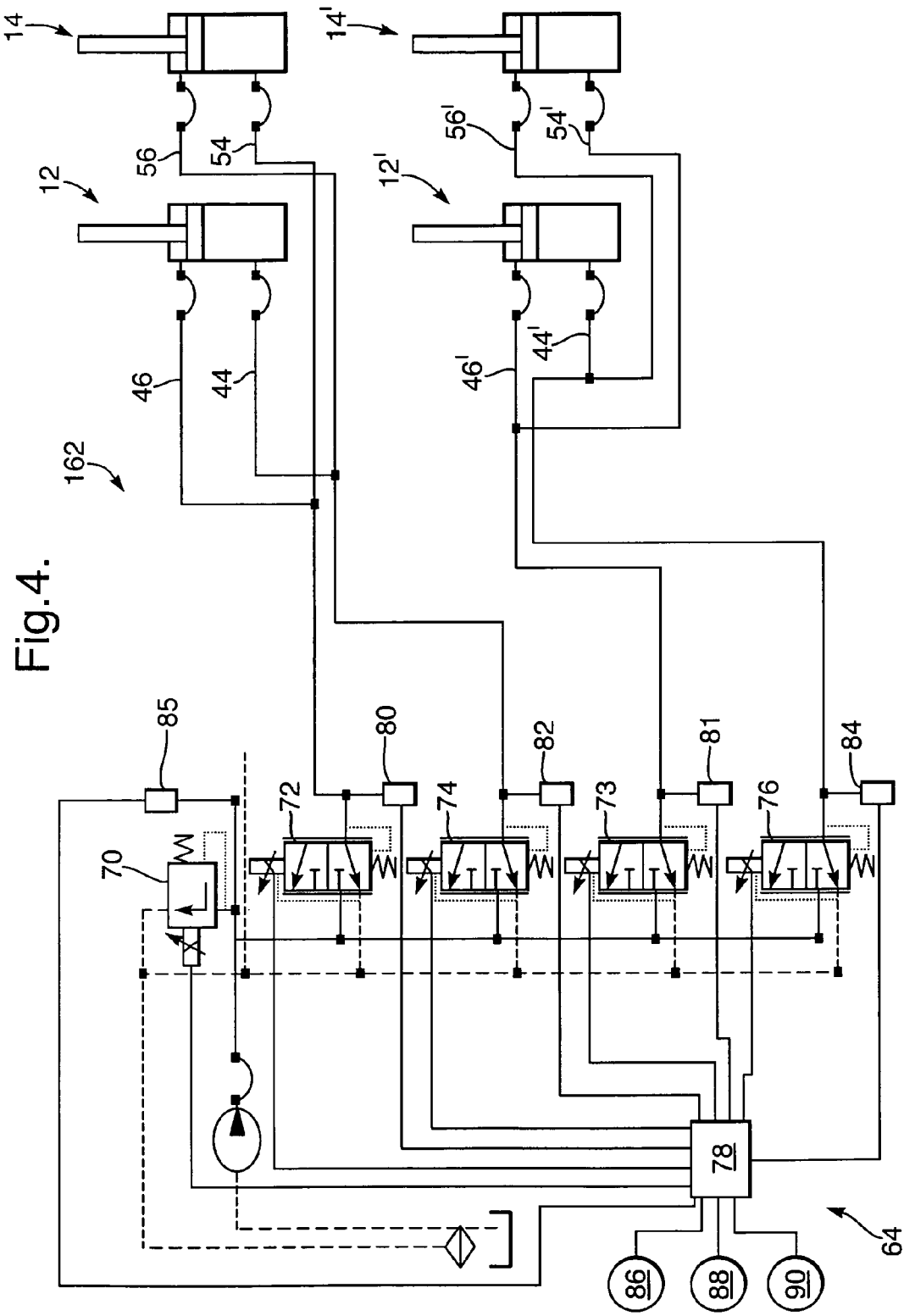
FIG. 4 is a schematic view of a roll control system in accordance with the present invention showing a second embodiment of the hydraulic system.

FIG. 4 shows a second embodiment of the hydraulic system 162 and electrical control system 164 of the roll control system 10 of FIGS. 1 and 2. The hydraulic system 162 is substantially identical to the hydraulic system 62 of the first embodiment, and like parts have been given the same reference numeral. The electrical control system 164 is substantially identical to the electrical system 64 of the first embodiment, and like parts have been given the same reference numeral.

In this second embodiment, a fourth pressure relief valve 73 with associated pressure sensor 81 has been added to compliment the operation of the first pressure relief valve 72. When the first pressure relief valve 72 is actuated to its second position, the rebound chamber 42 of the front first actuator 12 and the compression chamber 50 of the front second actuator 14 are fluidly disconnected from the tank 68 and fluidly connected to the pump 66 in order to receive pressurised fluid. When the fourth pressure relief valve 73 is actuated to its second position, the rebound chamber 42' of the rear first actuator 12' and the compression chamber 50' of the rear second actuator 14' are fluidly disconnected from the tank 68 and fluidly connected to the pump 66 in order to receive pressurised fluid. Other aspects of the second embodiment, and the operation of the roll control system, are substantially identical to that above with respect to the first embodiment.

In both embodiments, the pressure relief valves 72-76 are preferably solenoid actuated as shown in FIGS. 3 and 4. Alternatively, the pressure relief valves may be hydraulically actuated by first and second pilot (on/off) valves (not shown). In both embodiments, the pressure relief valves 72-76 have a first (rest) position in which the fluid chambers are fluidly connected to the tank 68 and a second (actuated) position in which the fluid chambers can receive pressurised fluid. It will be appreciated that the pressure relief valves 72-76 may have the reverse operation of the first position being the actuated position and the second position being the rest position.

The pump 66 may be driven by the vehicle engine and hence continuously actuated. Alternatively, the pump 66 is driven by an electric motor or any other suitable means, either continuously, or variably. The pressure control valve 70 is actuated to adjust the fluid pressure in the hydraulic system between a predetermined minimum pressure and a predetermined maximum pressure. The pressure control valve 70 is also actuated to adjust the pressure differentials between the compression and rebound chambers of the hydraulic actuators (when the pressure relief valves are also actuated as required).

In either of the above embodiments, the hydraulic actuator may include a check valve (not shown, but preferably mounted in the piston) which allows flow of hydraulic fluid from the first fluid chamber to the second fluid chamber only when the fluid pressure in the first fluid chamber is greater than the fluid pressure in the second fluid chamber. With such an arrangement, the second fluid chamber can be connected to a reservoir during servicing of the actuator to bleed air from the hydraulic fluid. Also, the presence of the check valve reduces the risk of air being sucked into the second fluid chamber should the fluid pressure in the second fluid chamber fall below the fluid pressure in the first fluid chamber, and provides further improvements in ride comfort.

The above embodiments describe a roll control system for front and rear axles of a motor vehicle. The orientation of each hydraulic actuator may be reversed with the housing connected to one end of the torsion bar, and the piston rod attachable to the axle. Although drop-link hydraulic actuators are shown, it will be appreciated that other designs of hydraulic actuator may be used.

Having thus described the invention, it is claimed:

1. A roll control system for a vehicle having a pair of front wheels each rotatable on a front axle and a pair of rear wheels each rotatable on a rear axle, the system comprising a front torsion bar; a front first hydraulic actuator attached to one end of the front torsion bar and connectable to the front axle; a front second hydraulic actuator attached to the other end of the front torsion bar and connectable to the front axle; a rear torsion bar; a rear first hydraulic actuator attached to one end of the rear torsion bar and connectable to the rear axle; a rear second hydraulic actuator attached to the other end of the front torsion bar and connectable to the rear axle; and a controller connected to the hydraulic actuators and controlling the operation thereof on detection of a predetermined vehicle condition; wherein each hydraulic actuator comprises a housing, a piston making a sealing sliding fit inside the housing to define a first fluid chamber and a second fluid chamber, and a piston rod connected to the piston and extending through the second fluid chamber and out of the housing; wherein the controller comprises a source of fluid pressure, a fluid reservoir, a pressure control valve fluidly connected between the pressure source and the reservoir, and a plurality of pressure relief valves each having positions to selectively fluidly connect the fluid chambers of the hydraulic actuators to one of the pressure source or the fluid reservoir; wherein the pressure relief valves are positioned on detection of the predetermined vehicle condition to apply a fluid pressure to the first fluid chamber of the first front hydraulic actuator and to the second fluid chamber of the second front hydraulic actuator.

2. The roll control system of claim 1, wherein the pressure relief valves are positioned on detection of the predetermined vehicle condition to apply a fluid pressure to the second fluid chamber of the first front hydraulic actuator and to the first fluid chamber of the second front hydraulic actuator.

3. The roll control system of claim 1, wherein the pressure relief valves are positioned on detection of the predetermined vehicle condition to apply a fluid pressure to the first fluid chamber of the first rear hydraulic actuator and to the second fluid chamber of the second rear hydraulic actuator.

4. The roll control system of claim 1, wherein the pressure relief valves are positioned on detection of the predetermined vehicle condition to apply a fluid pressure to the second fluid chamber of the first rear hydraulic actuator and to the first fluid chamber of the second rear hydraulic actuator.

5. The roll control system of claim 1, wherein said plurality of pressure relief valves comprises three pressure relief valves, wherein the second fluid chamber of the front first hydraulic actuator, the first fluid chamber of the front second hydraulic actuator, the second fluid chamber of the rear first hydraulic actuator, and the first fluid chamber of the rear second hydraulic actuator are fluidly connected to a single pressure relief valve.

6. The roll control system of claim 1, wherein said plurality of pressure relief valves comprises four pressure relief valves.

7. The roll control system of claim 1, wherein each of said plurality of pressure relief valves has a rest position to fluidly connect the fluid chambers of the hydraulic actuators to the fluid reservoir and an actuated position to fluidly connect the fluid chambers of the hydraulic actuators to the pressure source.

8. The roll control system of claim 1, wherein said plurality of pressure relief valves are solenoid actuated.

9. The roll control system of claim 1, wherein the controller comprises an electrical control module electrically connected to, and controlling the operation of, the source of fluid pressure, the pressure control valve, and the pressure relief valves.

10. The roll control system of claim 9, further comprising a pressure sensor associated with each of said plurality of pressure relief valves, and a pressure sensor associated with the pressure control valve, the pressure sensors being connected to the electrical control module.

* * * * *